July 18, 1944.    L. L. WEISGLASS    2,353,980
MILLIAMPERE SECONDS TIMER
Filed July 4, 1942
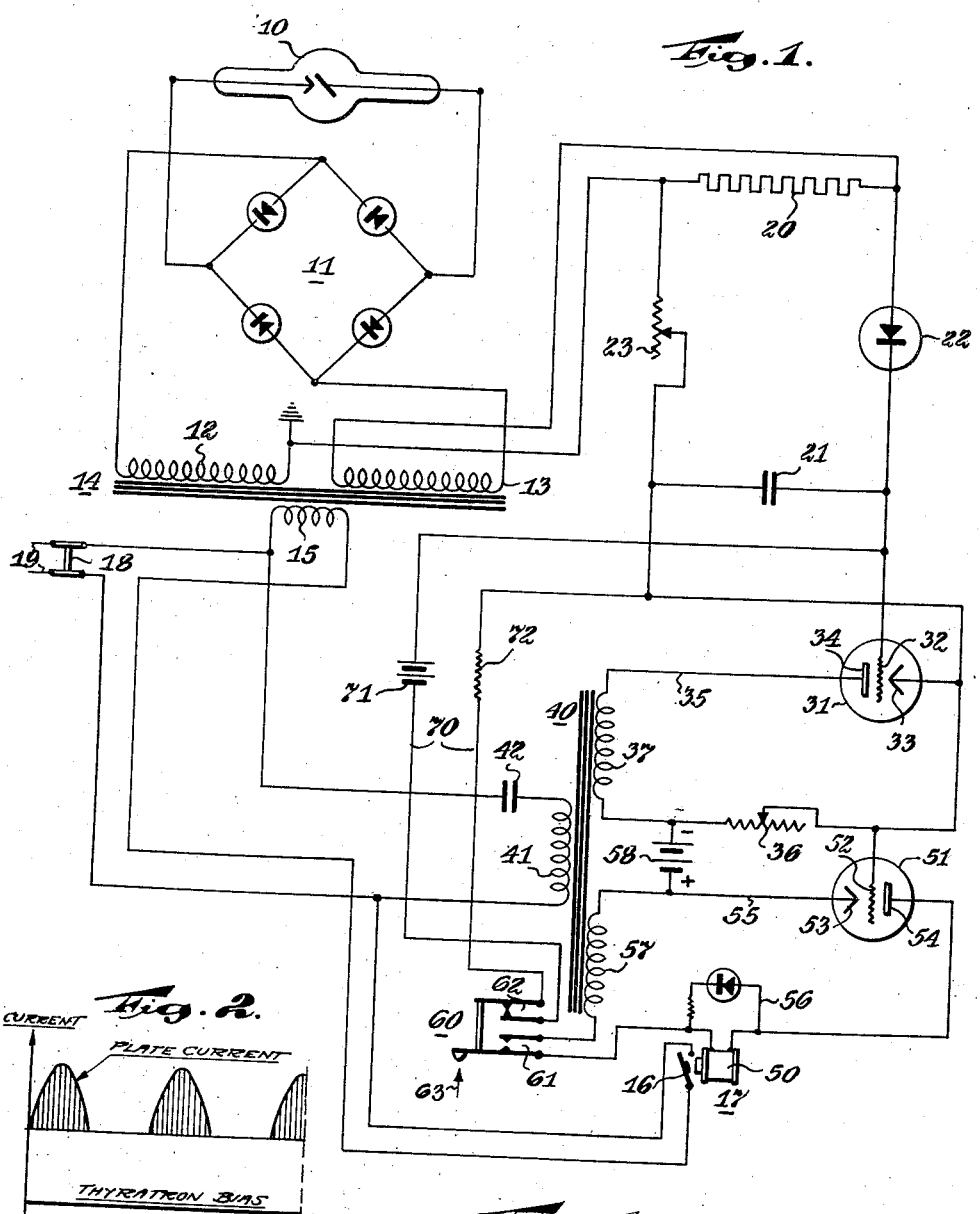
Fig. 1.
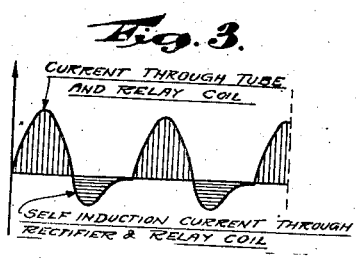
Fig. 2.
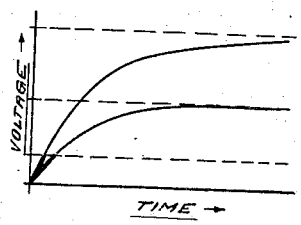
Fig. 3.
Fig. 4.
INVENTOR
L. L. WEISGLASS
BY
ATTORNEY Patented July 18, 1944

2,353,980

UNITED STATES PATENT OFFICE 2,353,980

MILLIAMPERE SECONDS TIMER

Louis L. Weisglass, New York, N. Y., assignor to Westinghouse Electric & Manufacturing Company, East Pittsburgh, Pa., a corporation of Pennsylvania Application July 4, 1942, Serial No. 449,816

5 Claims. (Cl. 250—95)

The invention relates to X-ray apparatus, and more particularly to exposure systems for controlling the operation of such apparatus.

The customary method of adjusting an X-ray apparatus to an exposure of a desired millampere-second value (M. A. S.) is to set the tube current by means of the filament regulator and to select the exposure time on a timing device so that the product of the chosen milliamps and seconds amounts to the required M. A. S. value. It is also known to use, instead of an ordinary timer, a milliampere-seconds relay as an integrating device in order to interrupt the excitation current of the X-ray tube in dependence upon a predetermined M. A. S. value.

The invention concerns itself with the latter type of X-ray exposure systems and aims at improvements as regards operation, accuracy, adaptability and simplicity of the electrical integrating and relay control means of such a system. More in detail, one of the objects of the invention is to obtain a milliampere-seconds timer of high accuracy throughout an extensive range of selective M. A. S. values. It is also an object of the invention to permit employing an A. C. contactor as a timer relay and providing an electronically-controlled A. C. power circuit for the relay coil without thereby impairing the accuracy of response to the correct M. A. S. value or requiring integrating or measuring means of inconvenient dimensions or intricate construction. A further object, referring to an electronic relay control, is to afford an easy calibration or readjustment of the system should the exchange of a control tube become necessary. Still another object consists in providing an exposure system which, though directly responding to the high voltage current of the X-ray circuit, operates with very low instrument voltages and currents and hence can be formed of customary and simple components of small compass and low current consumption.

According to the invention, in one of its aspects, an X-ray apparatus, having an energizing network controlled by a timer relay, is provided with a voltage source whose output voltage depends on the milliamperage of the X-ray current. A charging circuit, containing resistance means and a capacitor in series-arrangement, is connected with the voltage source so that the capacitor accumulates a charge of increasing voltage supplied from the voltage source during exposure periods at a rate determined by the time constant of the circuit. Hence, when effecting an exposure, the voltage built up across the capacitor is at any instant a measure of the amperage integral over the exposure time, i. e. the capacitor acts as an integrating device. A voltage-measuring circuit serves to determine the capacitor voltage and, in turn, controls the energizing circuit of the timer relay so as to terminate the exposure when the increasing capacitor voltage reaches a given magnitude. More particularly, the voltage-measuring circuit in a system as just described is an electrometric tube circuit while the relay-energizing circuit controlled thereby contains a grid-controlled gas discharge tube. Another feature of the invention is the provision of particular bias means connected with the capacitor for determining its starting voltage and rendering it different from zero in order to reduce the grid current of the electronic measuring means. The invention is further concerned with particular starting means and their constructive association with resetting means.

These and other features of the invention will be understood from the embodiment exemplified by the drawing.

Fig. 1 shows the complete circuit diagram of an X-ray apparatus and timing system according to the invention.

Figs. 2 and 3 are explanatory, and represent current characteristics of one of the valve circuits of the same timing system.

Fig. 4, also explanatory and referring to the same embodiment, is a voltage-time diagram for elucidating the operation and rating of other circuit elements of the timing system.

The apparatus illustrated in Fig. 1 has the electrode circuit of its X-ray tube 10 connected through a rectifier bridge 11 with two high voltage coils 12 and 13 of a transformer 14 whose primary 15, in series-arrangement with the contact 16 of a timer relay 17, is connected with a main switch or cut-out 18 through which the operating current is supplied from the line 19 carrying, for instance, utility current of ordinary voltage and frequency (110 v., 60 cycles). The two high voltage coils 12 and 13 have their midpoint grounded, a resistor 20 being inserted in the grounded midpoint connection. The connections of transformer 14 may include the customary control devices, such as selector or dial switches connected to taps of the primary and secondary coils for adjusting the milliamperage and kilovoltage of the X-ray tube. Such auxiliary devices are well known, not essential to the invention proper, and hence not illustrated in the drawing.

Connected with the resistor 20 is a charging circuit containing, in series-arrangement, a condenser 21, a rectifier 22, for instance of the thermionic type, and a variable resistor 23. The resistor 20 forms the voltage source of the charging circuit. During exposure periods, i. e. when energizing the X-ray tube, the high voltage current traversing the resistor 20 develops a voltage drop across this resistor proportional to the milliamperage of the tube current. This voltage drop of resistor 20 drives a charging current through rectifier 22 and resistor 23 into the condenser. As a result, the condenser builds up a voltage in accordance with the exposure energy supplied to the X-ray tube and at a rate depending upon the time constant of the charging circuit, the latter being adjustable by means of the variable resistor 23. The chosen adjustment of this resistor determines the exposure in milliampere-seconds as will be set forth in a later place. Assuming a proper rating and adjustment of the elements in the charging circuit, it will be apparent from the foregoing that during an exposure, the voltage of condenser 21 increases gradually so that its magnitude at any moment of the operating period, is proportional to the integral of the anode energy supplied to the tube.

The condenser 21, or rather the voltage occurring between its electrodes, is used for controlling the operation of the above-mentioned timer relay 17. To this end, a control network extends between the condenser 21 and the actuating coil 50 of the relay 17. The network comprises a three-electrode electrometer tube 31 having its electrodes 32 and 33 connected with the condenser electrodes respectively, and its plate 34 arranged in a plate circuit 35 in series with a variable resistor 36. An auxiliary transformer 40 has a primary 41 connected with the main switch 18 and a secondary 37 arranged in the anode circuit 35 for supplying anode voltage to the tube 31. A grid-controlled gas discharge tube is shown at 51. The plate circuit 55 of this tube 51 connects the tube electrodes 53 and 54 with another secondary 57 of the transformer 40 and includes the coil 50 of the timer relay 17. The control grid 52 of the gas discharge tube is connected with the plate circuit of the electrometer tube 31. A battery 58 disposed between the two tube circuits supplies a grid bias for tube 51.

A switch 60, preferably of the push-button type, is provided for starting the operation of the apparatus. The switch has two contact pairs 61 and 62. Pair 61 lies serially in the tube circuit 55 so as to close the circuit of the relay coil 50 when actuating the switch by moving its contact assembly in the direction of the arrow 63. Contact pair 62 controls a discharge circuit 70 which contains a battery 71 and a resistor 72 connected in series to the electrodes of condenser 21. The battery 71 determines the lowest starting potential of the condenser in order to reduce the grid currents to a minimum. That is, when the switch 60 is in the illustrated position, the condenser 21 is short-circuited through battery 71, contact pair 62 and resistor 72, and, after a preceding charge, discharges itself down to a minimum voltage determined by the battery 71. The discharge current is limited by the resistor 72.

A parallel path 56, containing a small junction-type rectifier and a series resistor, is connected across the relay coil 50. The transformer 40 should be stabilized from line fluctuations, and to this end contains an auxiliary condenser 42 in its primary circuit.

The apparatus operates as follows.

In the illustrated position of the switch and contact elements, the system is inoperative but, due to the main switch 18 being closed, is ready for an exposure. In this condition, the integrating condenser is discharged through the closed circuit 70 but retains a minimum charge and minimum voltage determined by the battery 71. The relay circuit 55 is opened at 61, and hence relay contact 16 is in its open position so as to prevent the energization of the high voltage transformer 14.

In order to effect an exposure, the push-button switch 60 is pressed and kept in the pressed position until the exposure is automatically completed, unless the operator for any reason intends to interrupt the exposure by prematurely releasing the button.

Pressing the switch 60 has the effect of opening contacts 62, thereby disconnecting the discharge circuit 70 from the condenser 21 so that the latter is ready to accumulate a charge from resistor 20. At the same time, contacts 61 are closed and complete the plate circuit 55 of the gas discharge tube 51. As a result, the relay coil 50 is energized from the secondary 57 of transformer 40. The relay contact 16 is attracted and connects the primary 15 of the high voltage transformer 14 to the line. Consequently, the X-ray tube 10 is now energized and the exposure started.

During the exposure, the resistor 20 maintains a voltage drop in proportion to the milliamperage of the anode energy supplied to the tube and causes the condenser 21 to be charged beyond the minimum charge previously supplied by the battery 71. As the exposure progresses, the voltage across condenser 21 increases gradually.

The bias voltage applied by battery 58 to the grid of the gas discharge tube 51 is high enough to render the grid 52 ineffective as long as the X-ray current is zero or nearly zero. Hence at the beginning of an exposure, and as above mentioned, the relay coil 50 becomes energized when starting an exposure. However, when the condenser voltage across 21 increases, the current in the plate circuit of the electrometer tube 31, biased by an increasingly negative grid potential at 32, is proportionally reduced until the potential of grid 52 reaches the limit value for blocking the discharge in tube 51. This limit value depends on the grid bias effected by battery 58, and on the resistance of resistor 36, and can be properly calibrated by adjusting this resistor. Upon reaching the blocking limit, the flow of current through circuit 55 is interrupted, the relay coil 50 is deenergized, and the relay contact 16 opened. This cuts off the current supply to the primary 15 of the high voltage transformer. The condenser 21, having very low leakage when disconnected from the discharging circuit 70, retains its eventual charge sufficiently long to keep the control network in the last-mentioned condition. Therefore, the exposure is now definitely terminated.

By releasing the push button 60, the discharge circuit 70 becomes effective and the system assumes the original condition ready for another exposure.

The plate current of the discharge tube 51 is a half-wave current as represented by the current-time diagram of Fig. 2. Such an intermittent current is not well suited for operating the coil of an A. C. contact relay. Nevertheless, such a relay can be used at 17 if a parallel path of the illustrated type (56) is employed. The small rectifier in series with a resistor permits the self-induction current of the relay coil 50 to flow through these elements in the stop phases of the gas discharge tube 51 so that vibrations of the relay contact are prevented. The resulting current curve is represented by the current-time diagram of Fig. 3.

As mentioned previously, the time elapsing from the starting moment until the charge of condenser 21 reaches the critical voltage for blocking the control tube 51, and hence the duration of the exposure, depend on the milliamperage in the X-ray tube circuit and on the time constant of the charging circuit containing resistor 23. Consequently, the exposure period established by the system depends on the milliampere-seconds product. All circuit elements of the charging circuit being constant except the resistor 23, the time constant of the charge can be adjusted merely by varying the resistance value of resistor 23. This resistor can be calibrated in milliampere-seconds, thus permitting an easy selection of the desired exposure before setting the system in operation. If the milliamperage of the X-ray tube circuit is kept constant, the scale of resistor 23 may also be gauged in seconds if desired.

In order to obtain a simple calibration of the adjustable resistor, and in the interest of high accuracy of operation, the following relative rating of the circuit elements in the charging circuit is preferable.

Although the voltage built up in condenser 21 is definitely determined by the voltage of the voltage source of the charging circuit, i. e. the voltage drop in resistor 20, which in turn maintains a linear proportion to the X-ray tube current, the voltage increase in condenser 21 follows strictly not a linear law but obeys the exponential function $$C_t = E\left(1 - \epsilon^{-\frac{t}{RC}}\right)$$

wherein $t$=time
$C_t$=voltage at the time $t$
$E$=charging voltage=$I_t \cdot R$
$\epsilon$=base of the natural logarithm.

Two exponential voltage curves relating to different charging voltages are exemplified by the voltage-time diagram of Fig. 4. While, according to the diagram, the voltage curves are non-linear, their initial portions are virtually straight. Therefore, if the highest charging voltage utilized, of condenser 21, is kept very small as compared with the lowest voltage drop (for lowest used tube currents) in resistor 20, a linear proportion is maintained between X-ray tube current and exposure time for equal M. A. S. settings of the adjusting means. That is, the calibration and adjustment of the resistor 23 are simplified and an equal degree of accuracy is obtained within the available range of exposures.

For these reasons, the constants of the charging circuit should be so chosen that the lowest voltage drop in resistor 20 is several or many times larger than the highest voltage across condenser 21. For instance, the highest condenser voltage may be approximately ten volts. A relatively high voltage drop in resistor 20 is required as well as a high resistance in 23 to operate satisfactorily within an exposure range of, for instance, 10 to 300 M. A. S. The capacity of the measuring condenser 21, for the same reasons, is rather small, for instance 2 mf. This means that the leakage of this condenser and the grid current of the tube 31 must be very small. Under such conditions, the above-described use of a tube voltmeter for measuring the condenser voltage is preferable to other available measuring devices. The use of a battery as indicated at 11 is also favorable to the just-mentioned conditions because of the reduction in grid current obtained thereby.

The adjustment of resistor 36 need not be changed when operating the system. When exchanging a tube, however, this resistor permits recalibrating the system correctly by changing its adjustment in accordance with the possible differences in the constants of the new tube.

It thus becomes obvious to those skilled in the art that an X-ray system is herein provided in which the energization of the X-ray tube in milliampere-seconds is accurately controlled thereby assuring the correct exposure for each part of the anatomy in accordance with standard charts.

Although one embodiment of the invention has been shown and described, it is to be understood that other modifications thereof may be made without departing from the spirit and scope of the appended claims.

I claim:

1. An exposure system for X-ray apparatus, comprising a voltage source controlled by the apparatus for producing an output voltage proportional to the exposure current of the apparatus, a charging circuit of given time constant connected to said voltage source and containing a low leakage capacitor for accumulating in the latter a charge of increasing voltage supplied from said source during exposure periods, an electrometric tube circuit connected with said capacitor for measuring said voltage, a relay for controlling the apparatus, and a grid-controlled gas discharge tube having a plate circuit connected with said relay and a grid circuit connected with said electrometric tube circuit for controlling said relay and to cause it to terminate the exposure when said capacitor voltage reaches a given magnitude.

2. The combination with an X-ray apparatus having an X-ray tube and a network for energizing said tube, of an exposure system comprising a resistor connected with said network and having a voltage drop proportional to the amperage supplied to said tube, a charging circuit containing in series variable resistance means and a low leakage capacitor for accumulating a charge of increasing voltage supplied by said resistor during exposure periods, a relay having control contacts disposed in said energizing network to control the energization of said tube, a control network disposed between said capacitor and said relay, a discharge tube forming part of said control network and having a plate circuit for controlling said relay and a grid circuit connected with said capacitor for actuating said relay and operable to stop the energization of said tube in response to said capacitor voltage reaching a given magnitude, a discharge circuit connected across said capacitor for reducing the current in said grid circuit, said discharge circuit containing a voltage source rated for impressing on said capacitor a low voltage as compared with said magnitude to maintain the starting voltage of said capacitor at a given value different from zero, and circuit control means connected with said discharge circuit for disconnecting said voltage source from said capacitor during exposure periods.

3. The combination with an X-ray apparatus having an X-ray tube and a network for energizing said tube, of an exposure system comprising a resistor connected with said network and having a voltage drop proportional to the amperage supplied to said tube, a charging circuit containing in series variable resistance means and a capacitor for accumulating a charge of increasing voltage supplied by said resistor during exposure periods, a relay having control contacts disposed in said energizing network to control the energization of said tube, a control network disposed between said capacitor and said relay, a discharge tube forming part of said control network and having a plate circuit for controlling said relay and a grid circuit connected with said capacitor for actuating said relay and operable to stop the energization of said tube in response to said capacitor voltage reaching a given magnitude, a voltage source connected across said capacitor and rated for impressing on said capacitor a low voltage as compared with said magnitude to maintain the starting voltage of said capacitor at a given value different from zero in order to reduce the current in said grid circuit, contact means interposed between said capacitor and said source for disconnecting the latter during exposures, and a starter switch disposed in said control network to cause, when actuated, said control network to energize said relay, said switch and said contact means forming a unit operable to automatically disconnect said voltage source from said capacitor when said switch is actuated for starting an exposure.

4. The combination with an X-ray apparatus having an X-ray tube and a network for energizing said tube, of an exposure system comprising a resistor connected with said network and having a voltage drop proportional to the current supplied to said tube, a charging circuit connected across said resistor and comprising in series variable resistance means and a low-leakage capacitor for accumulating a charge of increasing capacitor voltage during exposures, a measuring circuit connected with said capacitor for measuring said voltage, a relay having a relay coil and contacts, the latter being disposed in said energizing network to control the energization of said tube, a gas discharge tube having a grid circuit connected to said voltage-measuring circuit, alternating current supply means controlled by said discharge tube and connected with said relay, a valve circuit disposed in parallel to said relay in order to carry the self-induction current of said relay coil in the blocking intervals of said discharge tube, and switch means under control of the operator for connecting said current supply means through said discharge tube with said relay coil for starting an exposure to be terminated by the grid control caused by said measuring circuit when said capacitor voltage exceeds a given magnitude.

5. An X-ray apparatus having an X-ray tube, an alternating current circuit for supplying exposure energy to said tube, a high voltage transformer disposed between said circuit and said tube, said transformer having two high voltage secondaries arranged in series and connected to said tube, the intermediate connection of said secondaries being grounded and containing a resistor for developing a voltage drop proportional to the high voltage current supplied to said tube, a charging circuit connected with said resistor and containing in series a rectifier, a variable resistance means and a capacitor for accumulating a charge of increasing capacitor voltage during exposure periods, a voltmetric tube circuit connected with said capacitor for measuring said capacitor voltage, a relay having a coil and contacts controlled by said coil, said contacts being inserted in said A. C. supply circuit for controlling the energy supply to said tube, an A. C. power circuit connected with said relay coil and containing a gas discharge tube having a grid circuit connected with said voltmetric tube circuit and operable to block the flow of current through said gas discharge tube to said relay coil when said capacitor voltage exceeds a given magnitude, and switch means under control of the operator and disposed in said power circuit in series with said gas discharge tube for closing the relay circuit when starting an exposure.

LOUIS L. WEISGLASS